(12) United States Patent
Yu et al.

(10) Patent No.: US 7,306,381 B2
(45) Date of Patent: Dec. 11, 2007

(54) LATCHING MECHANISM AND ELECTRONIC MODULE HAVING SAME

(75) Inventors: Juhyun Yu, Hitachi (JP); Ryuta Takahashi, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/516,726

(22) Filed: Sep. 7, 2006

(65) Prior Publication Data

US 2007/0149028 A1  Jun. 28, 2007

(30) Foreign Application Priority Data

Dec. 28, 2005  (JP)  ............................ 2005-378812

(51) Int. Cl.
 *G02B 6/36* (2006.01)
(52) U.S. Cl. ........................................ 385/92; 439/352
(58) Field of Classification Search ................. 385/92, 385/88; 439/352, 353, 354, 357
 See application file for complete search history.

(56) References Cited

U.S. PATENT DOCUMENTS

| | | | |
|---|---|---|---|
| 6,178,096 B1 | 1/2001 | Flickinger et al. | |
| 6,287,128 B1 * | 9/2001 | Jones et al. | 439/76.1 |
| 6,502,998 B2 * | 1/2003 | Yen et al. | 385/88 |
| 6,580,614 B2 * | 6/2003 | Yen et al. | 361/728 |
| 6,744,963 B2 * | 6/2004 | Hwang | 385/139 |
| 6,746,158 B2 * | 6/2004 | Merrick | 385/53 |
| 6,749,448 B2 * | 6/2004 | Bright et al. | 439/160 |
| 6,767,143 B2 * | 7/2004 | Huang | 385/92 |
| 6,824,416 B2 * | 11/2004 | Di Mascio | 439/352 |
| 6,851,867 B2 * | 2/2005 | Pang et al. | 385/88 |
| 6,855,558 B1 * | 2/2005 | Hattori | 436/160 |
| 6,872,010 B1 * | 3/2005 | Bianchini | 385/92 |
| 6,893,168 B2 * | 5/2005 | Huang et al. | 385/92 |
| 6,908,323 B2 * | 6/2005 | Ice | 439/160 |
| 6,916,123 B2 * | 7/2005 | Kruger et al. | 385/92 |
| 6,945,809 B2 * | 9/2005 | Ishigami et al. | 439/372 |
| 7,004,772 B1 * | 2/2006 | Hsiao et al. | 439/160 |
| 7,090,523 B2 * | 8/2006 | Shirk et al. | 439/352 |
| 7,101,093 B2 * | 9/2006 | Hsiao et al. | 385/92 |
| 7,118,281 B2 * | 10/2006 | Chiu et al. | 385/53 |
| 7,204,712 B2 * | 4/2007 | Schwiebert et al. | 439/352 |
| 7,213,980 B2 * | 5/2007 | Oki et al. | 385/92 |
| 2002/0093796 A1 * | 7/2002 | Medina | 361/728 |
| 2002/0136501 A1 * | 9/2002 | Yen et al. | 385/88 |
| 2003/0072539 A1 * | 4/2003 | Huang et al. | 385/92 |
| 2003/0236019 A1 * | 12/2003 | Hanley et al. | 439/372 |
| 2004/0033027 A1 * | 2/2004 | Pang et al. | 385/53 |
| 2004/0101257 A1 * | 5/2004 | Kruger et al. | 385/92 |
| 2004/0219819 A1 * | 11/2004 | Di Mascio | 439/352 |
| 2004/0235332 A1 * | 11/2004 | Ice | 439/352 |
| 2005/0208822 A1 * | 9/2005 | Ishigami et al. | 439/372 |
| 2005/0281514 A1 * | 12/2005 | Oki et al. | 385/92 |

(Continued)

*Primary Examiner*—Ross Gushi
(74) *Attorney, Agent, or Firm*—McGinn IP Law Group, PLLC

(57) ABSTRACT

A latching mechanism for latching a housing of an optical transceiver to be inserted through a window on a panel of a communication device into a cage provided in the communication device. The latching mechanism has: an opening formed on a side wall of the housing; an engaging member housed in the housing; a spring member being operable to push out the engaging member in its release state; a pulling member being operable to draw the engaging member in the housing by transforming the spring member toward the front end of the housing; and a movable sleeve being operable to move in a direction to leave the housing.

7 Claims, 6 Drawing Sheets

U.S. PATENT DOCUMENTS

| | | | |
|---|---|---|---|
| 2005/0286837 A1* | 12/2005 | Oki et al. | 385/92 |
| 2005/0286838 A1* | 12/2005 | Oki et al. | 385/92 |
| 2006/0029335 A1* | 2/2006 | Hsiao et al. | 385/88 |
| 2006/0222301 A1* | 10/2006 | Oen et al. | 385/88 |
| 2006/0281357 A1* | 12/2006 | Chen et al. | 439/350 |
| 2007/0049099 A1* | 3/2007 | Potters | 439/352 |
| 2007/0110374 A1* | 5/2007 | Oki et al. | 385/89 |
| 2007/0140626 A1* | 6/2007 | Chan | 385/89 |

* cited by examiner

LATCHING MECHANISM AND ELECTRONIC MODULE HAVING SAME

The present application is based on Japanese patent application No. 2005-378812 filed on Dec. 28, 2005, the entire contents of which are incorporated herein by reference.

BACKGROUND OF THE INVENTION

1. Field of the Invention

This invention relates to a latching mechanism to latch an optical transceiver to a cage inside a communication device and, more particularly, to a latching mechanism which is rendered more functional and simpler. Also, this invention relates to an electronic module having the latching mechanism.

2. Description of the Related Art

As shown in FIG. 7, an optical transceiver 123 which transmits and receives light signals by connecting to an optical fiber 122 as a transmission path is incorporated in a communication device 121 to perform the optical communication. The optical transceiver 123 is not incorporated fixedly inside the communication device 121, however, it is used by providing a window 124 on the front or the back side of the panel of the communication device 121 and inserting the optical transceiver 123 through this window 124. As a result, the optical transceiver 123 can be replaced adequately to deal with the failure of the optical transceiver 123 and various communication use. Further, a receptacle 126 to insert a connector 125 of the optical fiber 122 is formed in the optical transceiver 123, and the optical fiber 122 can be inserted to and pulled out from the optical transceiver 123.

As shown in FIG. 8, in the communication device 121, a communication board 131 of which one end is approximated to the window 124 is provided, one side opening vessel called cage 132 to house the optical transceiver 123 inserted through the window 124 is provided on the communication board 131, and a connection terminal 133 (receiving side) for electric connection is provided at the back of the cage 132. The optical transceiver 123 houses an optical device 134 and an electrical circuit 135 necessary for optical transmission and reception in the housing 136 shaped substantially rectangular parallelepiped, and a connection terminal 137 (insert side) for electric connection is provided at the one end of this housing 136. If the optical transceiver 123 is inserted through the window 124 to the cage 132, the connection terminals 133 and 137 are connected electrically and mutual information transmissions between the communication device 121 and the optical transceiver 123 become possible electrically.

As shown in FIG. 9A, the latching mechanism is provided in the optical transceiver 123 so that this optical transceiver 123 which can be attached and removed freely to the communication device does not drop off from the communication device by an unexpected vibration or the impact, furthermore, an electric connection can be kept in a certain condition. In sum, basically, when the optical transceiver 123 exists at a certain position of an electric connection with the connection terminal, the engaging member 141 engaged the cage 132 which is a part of the communication device by projecting in the direction (arrow Y) intersecting with the plug-in direction (arrow X) is provided in the housing of the optical transceiver 123. Since the engaging member 141 engages with the optical transceiver 123 by projecting in the direction Y which intersects with the plug-in direction X to the cage 132, the optical transceiver 123 is latched. As shown in FIG. 9B, when pulling out the optical transceiver 123, it is retrieved in the housing so that the engaging member 141 does not engage with the cage 132.

In accordance with the above-mentioned basic fundamental principle, as it is optional to decide the shape of the engaging member 141 and the mechanism to make it projected from the housing of the optical transceiver 123 if matched to an engaging hole 142 of the cage 132, various cogitation has been done conventionally.

However, since various optical transceivers are assumed to be interchangeable, the size of width, height and the depth of the housing in an optical transceiver are provided by the code and standard as well as the window, the size of width, height and the depth of the cage in the communication device. Further, the size of the receptacle is also provided by the code and standard as well as the size of the connector of the optical fiber. The arrangement of the sending and receiving optical device is restricted corresponding to arrangement of the receptacle, and the arrangement of the electric circuit which enters between the sending and receiving optical device and the manual connection terminal is restricted. In the space between various members with such a restriction which can be used freely, more preferable latching mechanism should be achieved.

The related arts to the invention are, e.g., U.S. Pat. No. 6,178,096 and US2003/0072539.

SUMMARY OF THE INVENTION

The points required to the latching mechanism are listed below.

A) To minimize the size of the latching mechanism as much as possible and to assure the implementation space for other members
B) To simplify the fixation of the members which compose the latching mechanism.
C) To make easy to manage by decreasing the number of members which compose the latching mechanism.
D) To cut the unit cost by simplifying the structure and trimming weight of members which compose the latching mechanism.
E) To eliminate the caught of the engaging member occurred when pulling out the optical transceiver.
F) To prevent the engagement between the panel and the cage.

Accordingly, it is an object of the invention to solve the above-mentioned problem and to provide a simple latching mechanism and an electronic module having a latching mechanism.

(1) According to one aspect of the invention, a latching mechanism for latching a housing of an optical transceiver to be inserted through a window on a panel of a communication device into a cage provided in the communication device comprises:

an opening formed on a side wall of the housing;

an engaging member housed in the housing, the engaging member being operable to protrude outward from the housing through the opening to engage with the cage;

a spring member comprising one end connected to an in-housing part of the engaging member and an other end connected to a front end of the housing, the spring member being operable to push out the engaging member in its release state;

a pulling member engaged with the spring member, the pulling member being operable to draw the engaging member in the housing by transforming the spring member toward the front end of the housing; and a movable sleeve connected to the pulling member and provided outside the front end of the housing, the movable sleeve being operable to move in a direction to leave the housing.

In the invention (1), the following modifications and changes can be made.

(i) The latching mechanism further comprises: an engaging member guide extending obliquely from the opening toward inside the housing, wherein the engaging member is operable to protrude obliquely backward and outward from the housing by being slid along the engaging member guide.

(ii) The latching mechanism further comprises: a spring member holding groove formed at the front end of the housing, the spring member holding groove having a predetermined groove width, wherein the spring member comprises a waveform portion formed at the other end, the waveform portion having amplitude a little wider than the groove width of the spring member holding groove, and the spring member is secured to the housing by putting the waveform portion in the spring member holding groove.

(iii) The spring member comprises a bending portion in doglegged shape formed between the one end and the other end, and the pulling member is engaged with the bending portion.

(iv) The engaging member comprises a flat part formed on a side facing an inside of the cage, the flat part being formed longer than distance from an edge of the window of the communication device to a loading slot of the cage.

(v) The engaging member comprises engaging members disposed on both sides of the housing, the engaging members having a same shape and being formed to be symmetrical to each other when one of the engaging members is turned over.

(2) According to another aspect of the invention, an electronic module with a latching mechanism for latching a housing of the electronic module to be inserted through a window on a panel of a communication device into a cage provided in the communication device, wherein the latching mechanism comprises:

an opening formed on a side wall of the housing;

an engaging member housed in the housing, the engaging member being operable to protrude outward from the housing through the opening to engage with the cage;

a spring member comprising one end connected to an in-housing part of the engaging member and an other end connected to a front end of the housing, the spring member being operable to push out the engaging member in its release state;

a pulling member engaged with the spring member, the pulling member being operable to draw the engaging member in the housing by transforming the spring member toward the front end of the housing; and a movable sleeve connected to the pulling member and provided outside the front end of the housing, the movable sleeve being operable to move in a direction to leave the housing.

Advantage of the Invention

This invention has a beneficial effect as following.

(1) The latching mechanism is simplified.

BRIEF DESCRIPTION OF THE DRAWINGS

The preferred embodiments according to the invention will be explained below referring to the drawings, wherein:

FIGS. 9A and 9B are perspective views of the optical transceiver inserted in the cage, wherein FIG. 9A shows when latched and FIG. 9B shows that latching is released.

DETAILED DESCRIPTION OF THE PREFERRED EMBODIMENTS

Construction of Latching Mechanism

Figure 1:
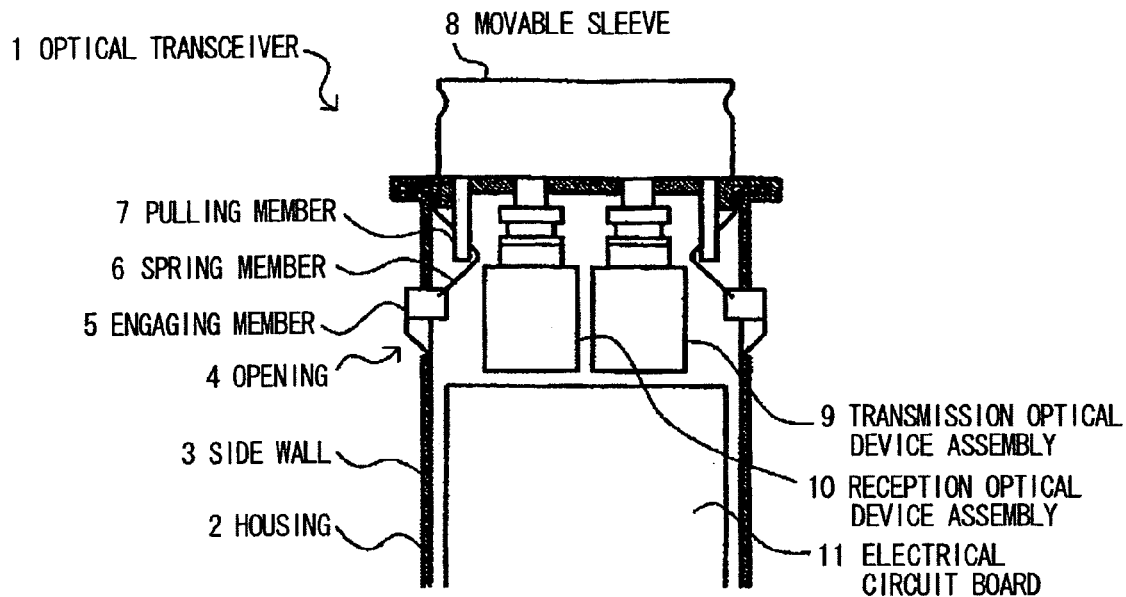
FIG. 1 is a partial cross sectional plan view of the optical transceiver showing the latching mechanism in the first preferred embodiment of this invention.
Figure 7:
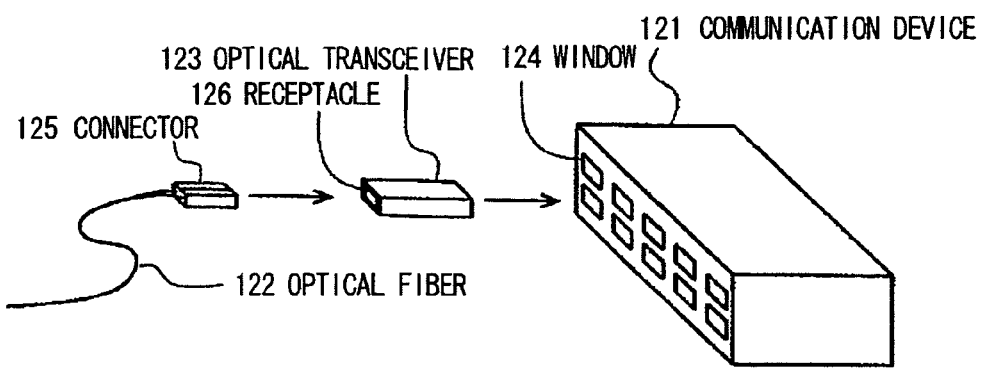
FIG. 7 is an exterior perspective view of the communication device and the optical transceiver.
Figure 8:
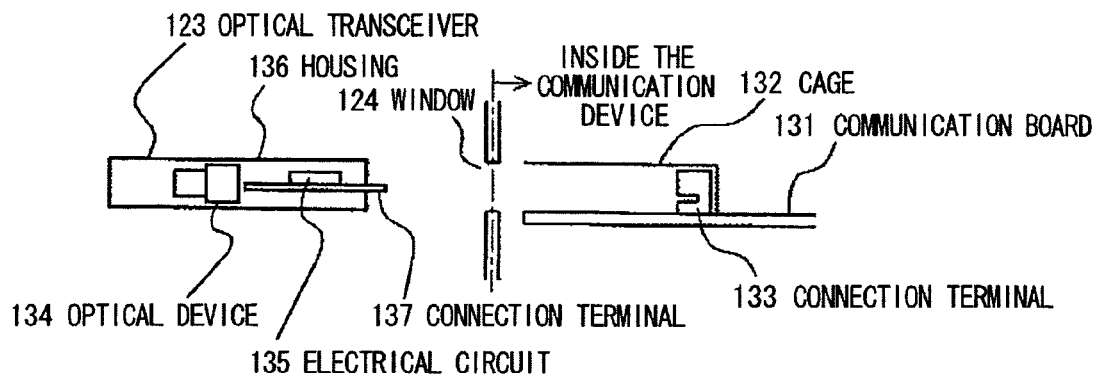
FIG. 8 is a sectional side view of the communication device and the optical transceiver.
Figure 9A:
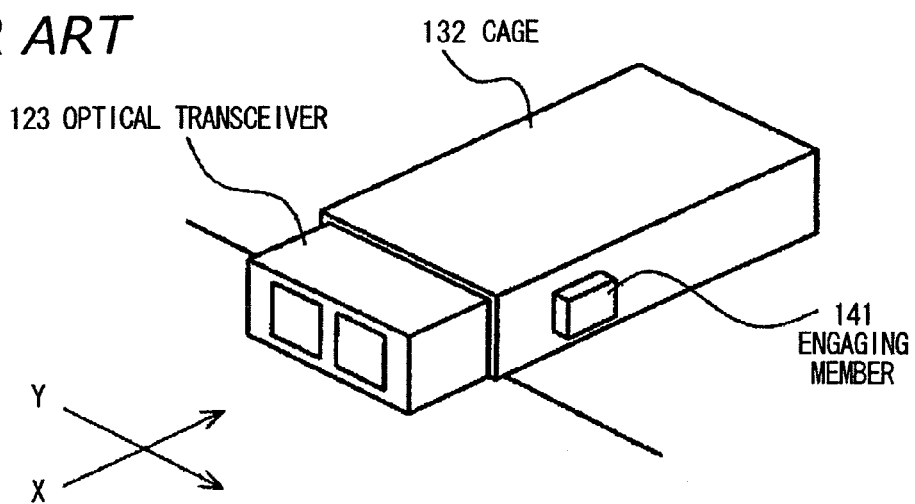
Figure 9B:
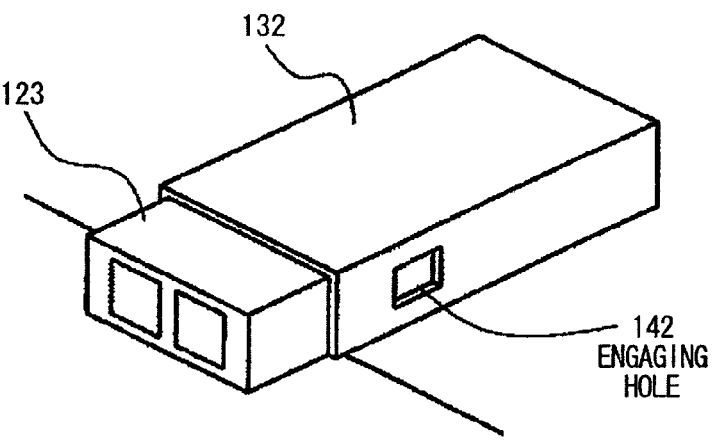

As shown in FIG. 1, a latching mechanism according to the invention is operable to latch a housing 2 of an optical transceiver 1 when the housing 2 is inserted in a cage (see FIG. 8 and FIG. 9) inside a communication device through a window (see FIG. 7) opened on a panel of the communication device. The latching mechanism of the invention comprises: an opening 4 formed on a side wall 3 of the housing 2 and facing the inside of the cage to allow an engaging member to enter and leave therethrough; the engaging member 5 housed in the housing 2 such that it is capable of having free adit through the opening 4 from the inside of the housing 2 to the outside of the housing 2 where the engaging member 5 engages with the cage; a spring member 6 to push the engaging member 5 out from the housing 2 when being released, the spring member 6 having one end connected to an in-housing part of the engaging member 5 and the other end fixed to the front and side portion of the housing 2 (the upper part of the figure is forward, and the right and left parts thereof are sideward); a pulling member 7 connected to the spring member 6 to transform the spring member 6 toward the front end of the housing 2 to draw the engaging member 5 in the housing 2; and a movable sleeve 8 disposed outside the front end of the housing 2 and connected to the pulling member 7, the movable sleeve 8 being capable of moving in a direction to leave the housing 2.

The housing 2 has a space shaped substantially rectangular parallelepiped (however, having some unevenness) and enclosed by the side wall 3, and a transmission optical device assembly 9, a reception optical device assembly 10 and an electrical circuit board 11 are housed in the space. The transmission optical device assembly 9 and the reception optical device assembly 10 penetrate through the side wall 3 on the front end of the housing 2, and are faced to a receptacle (see FIG. 7) for an optical connector. The movable sleeve 8 can be moved in the direction to leave the housing 2 while covering the outside of the receptacle and sliding along the outside of the receptacle. The pulling member 7 is a material being extended a predetermined length from the movable sleeve 8 toward the rear side of the housing 2 and, as described in detail later, it can draw the spring member 6 by being engaged with the spring member 6 or release the spring member 6 by being disengaged with the spring member 6.

Operation of the Latching Mechanism

Figure 2:
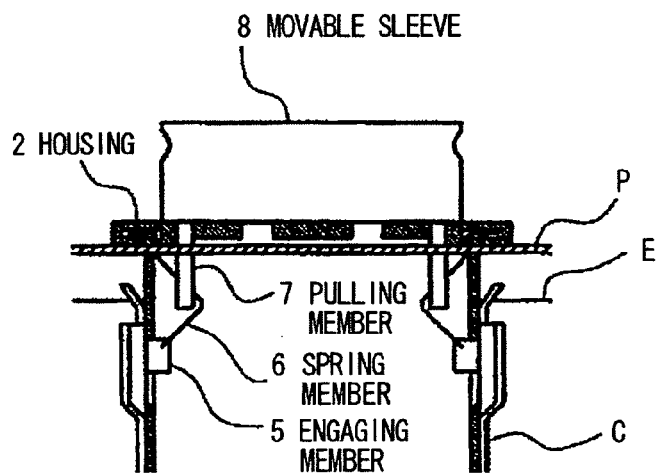
FIG. 2 is a partial cross sectional plan view showing that the optical transceiver in FIG. 1 is latched to the communication device.
Figure 3:
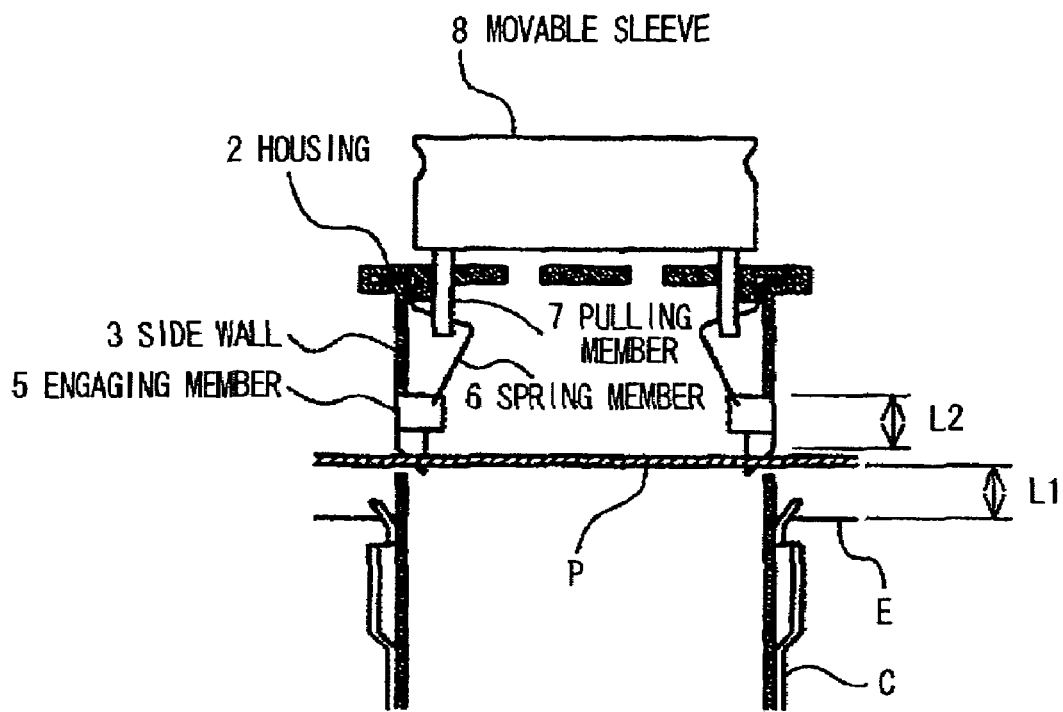
FIG. 3 is a partial cross sectional plan view showing that the optical transceiver in FIG. 1 is released from the communication device.
Figure 4:
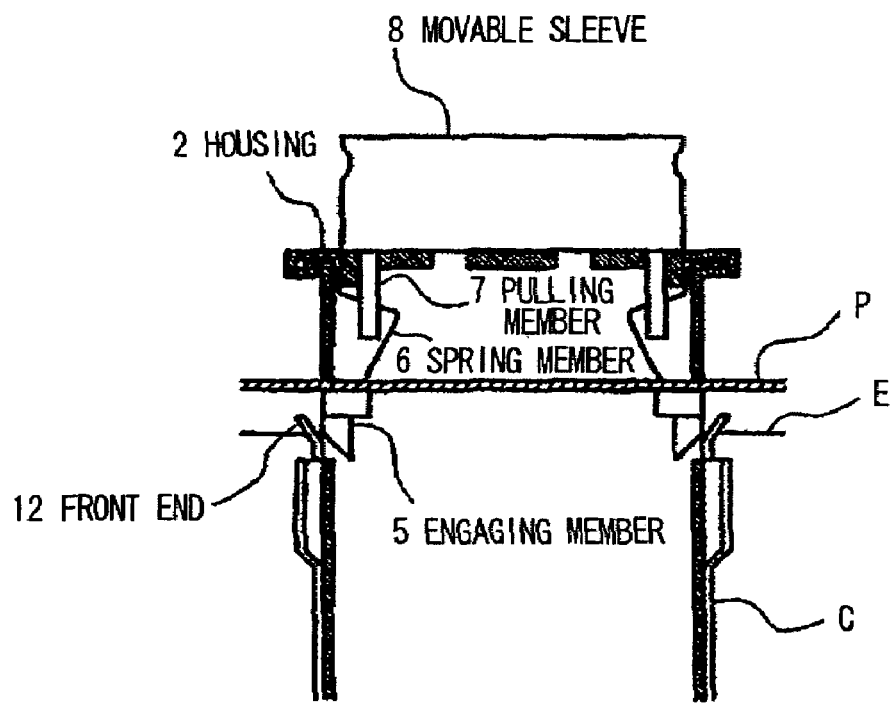
FIG. 4 is a partial cross sectional plan view showing that the optical transceiver in FIG. 1 is inserted to the communication device.

The operation of the latching mechanism of FIG. 1 will be described below, referring to FIGS. 2-4. FIGS. 2-4 show a panel P of a communication device, a front end E of the communication board and a side wall C of the cage. Meanwhile, members having no relation with the operation of the latch mechanism are omitted.

First of all, when being latched as shown in FIG. 2, the movable sleeve 8 contacts the front end of the housing 2, and therefore, the pulling member 7 is located at the innermost (on the rear side) of its movable area. At this time, the spring member 6 is in released state subjected to no biasing stress, and the engaging member 5 is pushed outside of the housing 2 and engaged in a bulging portion of the cage. In sum, the housing 2 is incapable of moving forward due to the engaging member 5 being engaged with the cage.

Next, as shown in FIG. 3, when releasing the latch, the movable sleeve 8 is taken away from the front end of the housing 2 by being pulled forward by a person and, therefore, the pulling member 7 is located more forward than when latched. At this time, the spring member 6 is transformed toward the front end of the housing 2. Due to the transformation of the spring member 6, the engaging member 5 is drawn in the housing 2. In FIG. 3, the engaging member 5 is drawn in a direction orthogonal to the side wall 3 of the housing 2. This is because an engaging member guide (not shown) is extended in the direction orthogonal to the side wall 3 of the housing 2 and the engaging member 5 being pulled by the spring member 6 slides along the engaging member guide.

When the engaging member 5 is drawn in the housing 2, the engaging member 5 is released from the cage. Thus, the latch to the cage is opened and the housing 2 is allowed to move forward. At this time, since the person is pulling the movable sleeve 8 forward, the housing 2 can be drawn out from the communication device by that power.

Next, as shown in FIG. 4, when inserting the communication device into the housing 2, the movable sleeve 8 contacts the front end of the housing 2 by the operation that the person pushes the housing 2 with the movable sleeve 8. Therefore, although the pulling member 7 located at the innermost, the spring member 6 is not engaged with the pulling member 7 because the engaging member 5 remains drawn in the housing 2. The reason why the engaging member 5 remains drawn in the housing 2 is that the engaging member 5 cannot come out of the housing 2 since it is restricted by the front end 12 of the cage. Further, before the engaging member 5 contacts the front end 12 of the cage, the engaging member 5 cannot come out of the housing 2 since it is restricted by the window of the communication device (see FIG. 7). The pulling member 6 is transformed biased to the front side of the housing by being pressed by the engaging member 5.

Thus, a flat part (with a length L2>L1) which is longer than the distance L1 (as shown in FIG. 3) from the panel P of the communication device to the loading slot of the cage is formed on the side of the engaging member 5 faced inside the cage so that the housing 2 can be inserted while leaving the engaging member 5 drawn in the housing 2. In FIG. 3, the starting point of the distance L1 is set to be the front end E of the communication board. This is considered for that the loading slot of the cage is enlarged in a taper form from the front end E of the communication board. By composing like this, since the engaging member 5 is restricted continuously by receiving the restriction from the front end 12 of the cage before the restriction by the window of the communication device is removed, the engaging member 5 is not engaged or less likely to be engaged in the space between the panel of the communication device and the communication board. In general, since the distance L1 of the space is about 3.3 mm, it is enough if L2 is adjusted to be 3.5 mm or more.

Then, by further inserting the housing 2, from the state that the engaging member 5 is restricted by the inside of the cage so that it cannot come out of the housing 2, the engaging member 5 can be engaged in the bulging portion of the cage as shown in FIG. 2. to complete the latch.

Engaging Member Guide and Engaging Member Stopper Wall

Figure 5:
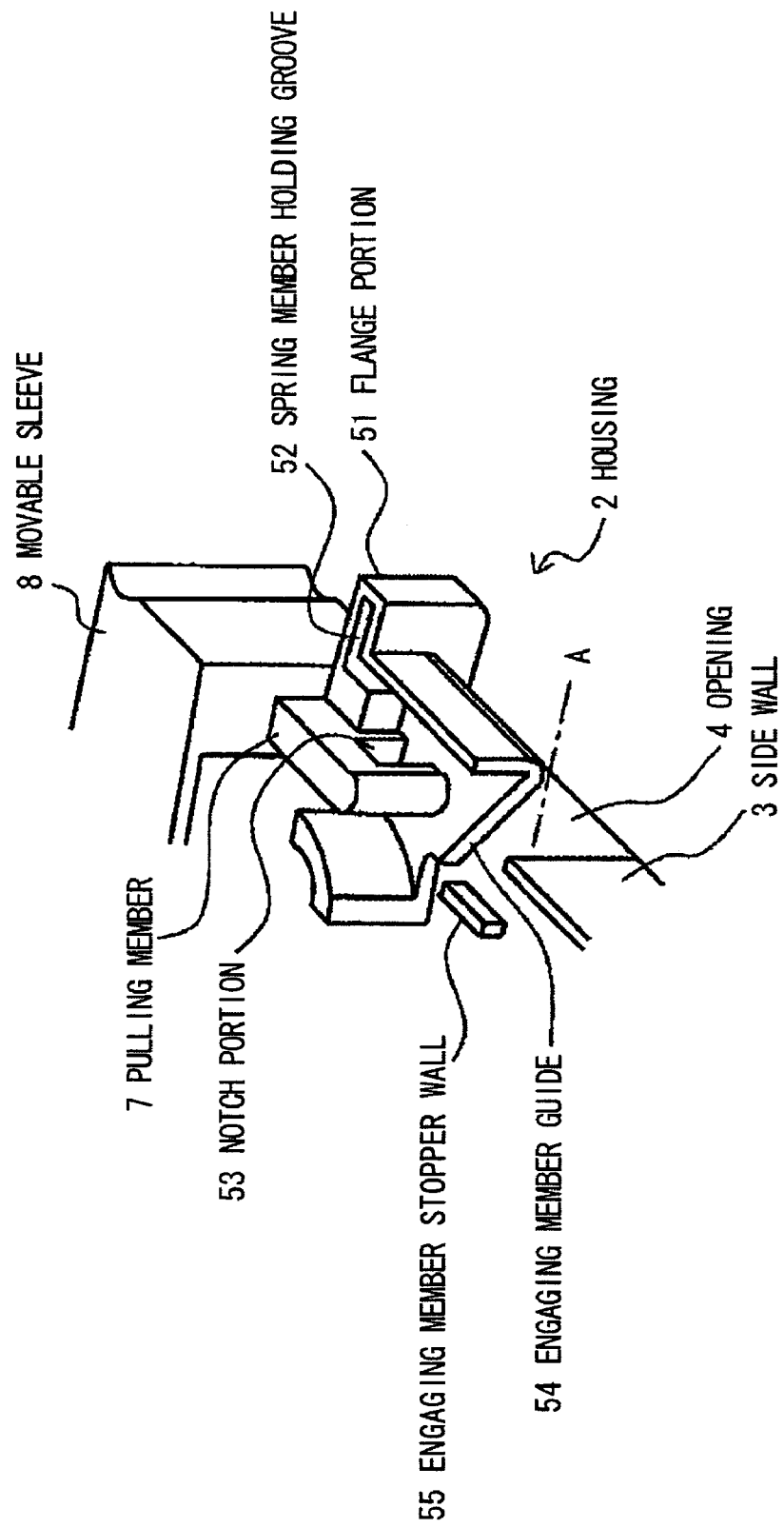
FIG. 5 is an enlarged perspective view of the left side of the front end in the housing of the optical transceiver in FIG. 1.

The engaging member guide and an engaging member stopper wall will be described below, referring to FIG. 5.

As shown, a flange portion 51 is formed on the front and side portion of the housing 2, and the side wall 3 as a side portion of the housing 2 extends from the flange portion 51 to the back of the housing 2. The opening 4 is formed on the side wall 3 by cutting a part of the side wall 3. The direction to pass through the opening 4 and to be orthogonal to the side wall 3 is indicated by one-dot chain line A. Although omitted in FIG. 5, the engaging member 5 is housed in the housing 2 such that it is capable of moving inside or outside of the opening 4. One end of the spring member 6 omitted in FIG. 5 is connected to the engaging member 5. Further, a spring member holding groove 52 is formed inside the wall thickness of the flange 51, and the other end of the spring member 6 is engaged and fixed to the spring member holding groove 52. A notch portion 53 is formed in the pulling member 7 so that the spring member 6 can be engaged to the pulling member 7.

Although it is described referring to FIG. 3 that the engaging member guide extends in a direction (as shown by the one-dot chain line A in FIG. 5) orthogonal to the side wall 3 of the housing 2, this means the case that the engaging member 5 is drawn in the direction orthogonal to the side wall 3, or the engaging member 5 projects orthogonally from the housing 2. In FIG. 5, an engaging member guide 54 extending obliquely inclined the front side from the opening 4 to the inside of the housing 2 is provided on the housing 2. Therefore, the engaging member 5 is drawn sliding along the engaging member guide 54. When pushed out, the engaging member 5 slides along the engaging member guide 54 and projects from the housing 2 obliquely backward.

If the engaging member 5 projects from the housing 2 orthogonally, when it is begun to be pulled out in the state that the engaging member 5 is engaged by the cage (i.e., it does not come out completely) so as to pull out the optical transceiver from the communication device, unnecessary stress is applied to the engaging member 5 or some friction occurs. In this regard, such an engagement can be eliminated if the engaging member 5 projects obliquely backward from the housing 2.

An engaging member stopper wall 55 is to prevent the engaging member 5 from moving further inside the housing 2. In the above-described normal operation, the engaging member 5 does not move inside the housing 2 beyond necessity. However, when the engaging member is pressed inside from the outside after the optical transceiver is pulled out from the communication device so that it is stored alone, the engaging member stopper wall 55 can restrict the inward movement of the engaging member 5.

Connection of Spring Member to Engaging Member

The connection of the spring member 6 to the engaging member 5 will be described below, referring to FIG. 6.

Figure 6A:
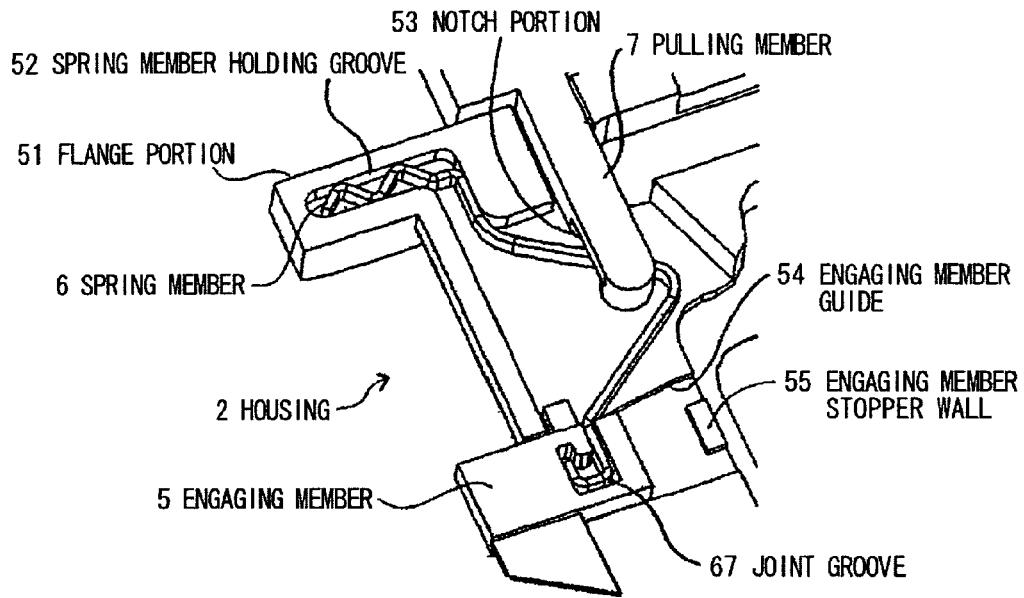
FIG. 6A is an enlarged perspective view of the left side of the front end of the optical transceiver in FIG. 1.
Figure 6B:
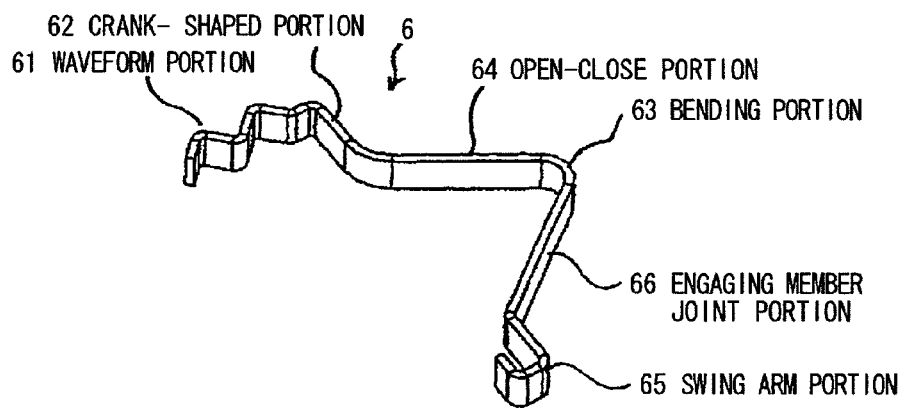
FIG. 6B is an enlarged perspective view of the spring member in FIG. 6A.

As shown in FIG. 6A and FIG. 6B, in the flange portion 51 formed at the front end of the housing 2, the spring member holding groove 52 with a predetermined groove width is formed extending laterally. The spring member holding groove 52 is bent in a crank shape and opened backward inside the housing 2. Corresponding to this, the spring member 6 has a waveform portion 61 with amplitude a little wider than the groove width of the spring member holding groove 52, and a crank-shaped portion 62 connected to the waveform portion 61. The spring member 6 is fixed to the housing 2 by engaging the waveform portion 61 with the spring member holding groove 52. Thus, since the spring member 6 is fixed to the housing 2 by the spring force of the waveform portion 61, fixing material such as a screw is not needed. Further, though the spring member 6 operates by receiving the force from outside through the pulling member 7 or the engaging member 5, it is easy to assemble since the whole spring member 6 is housed in the housing 2.

The spring member 6 is provided with one end connected to the engaging member 5 and the other end fixed to the spring member holding groove 52 of the front end of the housing 2. However, it is not straight between the one end and the other end, and has a bending portion 63 in a doglegged shape that is convex to the inside of the housing 2. A portion between the bending portion 63 and the crank-shaped portion 62 is called an open-close portion 64, and a portion between the bending portion 63 and an engaging member joint portion 65 is called a swing arm portion 66. The notch portion 53 of the pulling member 7 intersects with the open-close portion 64 as if striding over it. Thus, since the pulling member 7 is engaged to the bending portion 63 in doglegged shape of the spring member 6, the spring member 6 causes the open-close movement of an opening angle defined between the crank-shaped portion 62 and the open-close portion 64 in accordance with the anteroposterior stroke motion of the pulling member 7, as well as the swing movement of the swing arm portion 66.

The engaging member joint portion 65 is formed by bending the swing arm portion 66, and it is bent twice further smaller at nearly right angle to form a J-letter shape. On the other hand, a joint groove 67 formed corresponding to the engaging member joint portion 65 is formed in the engaging member 5, and the engaging member joint portion 65 is inserted in the joint groove 67. Since the joint groove 67 and the engaging member joint portion 65 are bent twice, they receive the pushing force from the spring member 6 when the engaging member 5 moves toward outside the housing 2, and they receive the drawing force from the spring member 6 when the engaging member 5 moves toward inside the housing 2. At this time, since the engaging member guide 54 is formed on the housing 2, the engaging member 5 moves along the engaging member guide 54. The spring member 6 causes transformation of the bending portion 63 as well as the above-mentioned swing movement.

Here, the arrangement position of the engaging member 5 shown in FIG. 6 corresponds to the left arrangement position in FIG. 1. Thus, as shown in FIG. 1, another engaging member 5 with the same shape as the engaging member 5 on the left side is disposed on the right side so that they are symmetrical with each other. The engaging members 5 are formed to be symmetrical between its front and back sides, and the engaging members 5 are used mutually turned over at the right and left arrangement positions. Because of this, the joint groove 67 is formed penetrating the front and back sides of the engaging member 5, and a convex, concave or inclination is formed to be symmetrical between the front and back sides. This contributes to reducing the number of parts. To reduce the number of parts leads to decrease the number of metal molds and to decrease the number of parts inventory control.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A latching mechanism for latching a housing of an optical transceiver to be inserted through a window on a panel of a communication device into a cage provided in the communication device, comprising:
   an opening formed on a side wall of the housing;
   an engaging member housed in the housing, the engaging member being operable to protrude outward from the housing through the opening to engage with the cage;
   a spring member comprising one end connected to an in-housing part of the engaging member and an other end connected to a front end of the housing, the spring member being operable to push out the engaging member in its release state;
   a pulling member engaged with the spring member, the pulling member being operable to draw the engaging member in the housing by transforming the spring member toward the front end of the housing; and
   a movable sleeve connected to the pulling member and provided outside the front end of the housing, the movable sleeve being operable to move in a direction to leave the housing.

2. The latching mechanism according to claim 1, further comprising:
   an engaging member guide extending obliquely from the opening toward inside the housing,
   wherein the engaging member is operable to protrude obliquely backward and outward from the housing by being slid along the engaging member guide.

3. The latching mechanism according to claim 1, further comprising:
   a spring member holding groove formed at the front end of the housing, the spring member holding groove having a predetermined groove width,
   wherein the spring member comprises a waveform portion formed at the other end, the waveform portion having amplitude a little wider than the groove width of the spring member holding groove, and
   the spring member is secured to the housing by putting the waveform portion in the spring member holding groove.

4. The latching mechanism according to claim 1, wherein:
   the spring member comprises a bending portion in doglegged shape formed between the one end and the other end, and
   the pulling member is engaged with the bending portion.

5. The latching mechanism according to claim 1, wherein:

the engaging member comprises a flat part formed on a side facing an inside of the cage, the flat part being formed longer than distance from an edge of the window of the communication device to a loading slot of the cage.

6. The latching mechanism according to claim 1, wherein:

the engaging member comprises engaging members disposed on both sides of the housing, the engaging members having a same shape and being formed to be symmetrical to each other when one of the engaging members is turned over.

7. An electronic module with a latching mechanism for latching a housing of the electronic module to be inserted through a window on a panel of a communication device into a cage provided in the communication device, the latching mechanism comprising:

an opening formed on a side wall of the housing;

an engaging member housed in the housing, the engaging member being operable to protrude outward from the housing through the opening to engage with the cage;

a spring member comprising one end connected to an in-housing part of the engaging member and an other end connected to a front end of the housing, the spring member being operable to push out the engaging member in its release state;

a pulling member engaged with the spring member, the pulling member being operable to draw the engaging member in the housing by transforming the spring member toward the front end of the housing; and a movable sleeve connected to the pulling member and provided outside the front end of the housing, the movable sleeve being operable to move in a direction to leave the housing.

* * * * *